T. DARK.
TRAPS FOR STREET SEWERS.
No. 185,017. Patented Dec. 5, 1876.
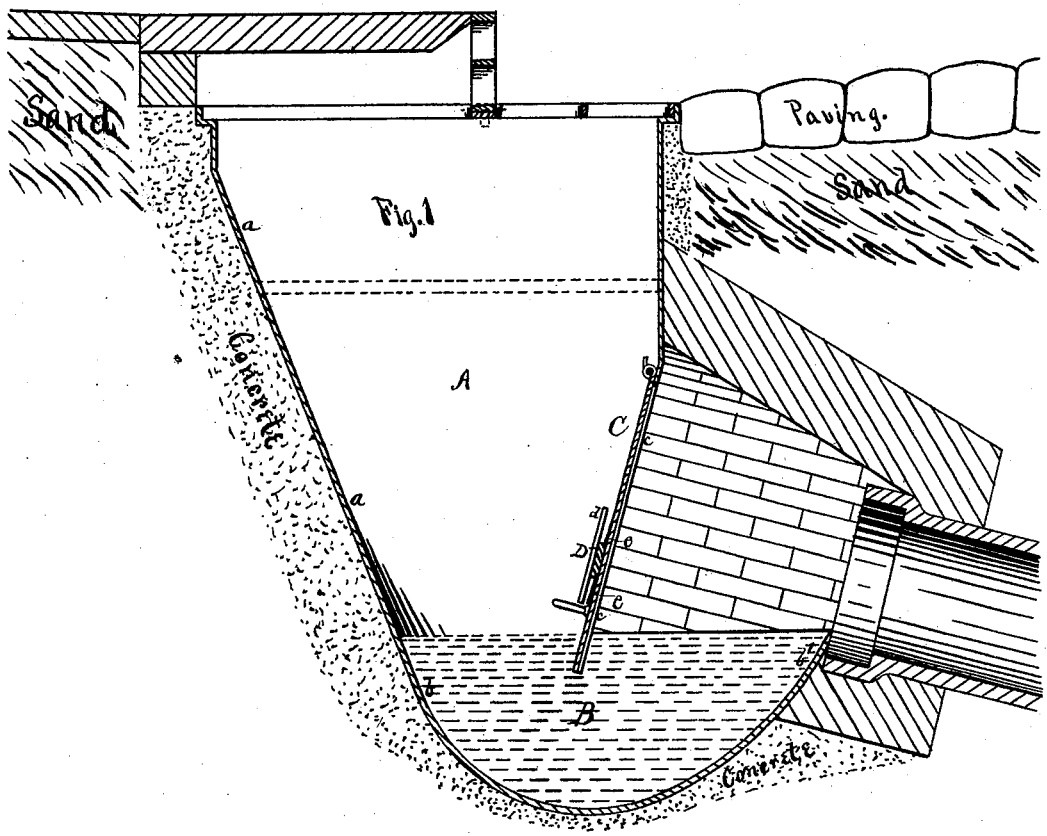
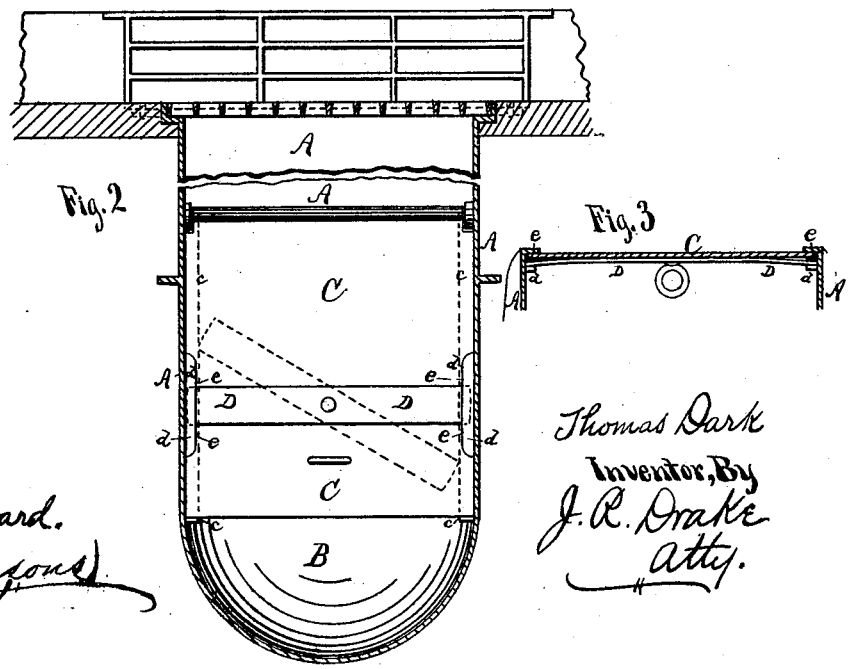

UNITED STATES PATENT OFFICE.

THOMAS DARK, OF BUFFALO, NEW YORK.

IMPROVEMENT IN TRAPS FOR STREET-SEWERS.

Specification forming part of Letters Patent No. 185,017, dated December 5, 1876; application filed January 7, 1876.

*To all whom it may concern:*

Be it known that I, THOMAS DARK, of Buffalo, in the county of Erie and State of New York, have made certain Improvements in Receivers and Stench-Traps for Street-Sewers, of which the following is a specification:

This is an improvement on my patent, No. 114,270, dated May 2, 1871; and it relates to the construction of the back of the receiver and bottom of the trap for the purpose of getting a greater power from the water to more effectually flush the trap. It also consists in an improved fastening for the gate to the sewer, as hereinafter specified.

In the drawings, Figure 1 is a sectional elevation; Fig. 2, a cross-section, showing the gate and fastening; and Fig. 3, a detail of the fastening.

A represents the receiver, and B the stench-trap, all made of cast-iron. The back $a$ of the receiver is made slanting, and the back $b$ of the bowl or trap B is constructed in a continuous slanting line with the back $a$, so as to get an unimpeded rush or fall of the water into the trap B. Formerly the basin B was made nearly round, but I now construct it with the delivery part $b'$, (that nearest the mouth of the sewer) elongated, with only a gradual rise, as clearly shown in Fig. 1. This, in practice, is found a great improvement over the old construction, as it will now "flush" out with greater ease and certainty than by the old form, the rush of water lifting the sand, &c., out and forcing it forward into the mouth of the sewer, and so on. The back $a$ and back $b$ of trap B, formed in a continuous line, is also of great importance, as by it I get an unimpeded rush and a greater force to the water, which materially aids in flushing the trap, as before stated.

The gate C is hung on journals, and dips into the water, which is always in the trap or basin B. This gate rests upon a flange, $c$, each side, and upon these a packing is laid, and the gate is closed and compressed upon the packing and flanges by a swinging cross-bar, D, (see Figs. 2 and 3,) which is pivoted in the center to the gate, the ends catching into lugs $d\ d$ on the sides of the receiver, and sliding on inclines $e\ e$ on the gate, thus making a tight trap, and a fastening easily got at when it is desired to open the gate to clean out the sewer.

In my former invention rods were used for fastening; but they were found to catch sticks, straw, and the débris of the streets.

The present fastening, above described, keeps the gate much tighter, effectually preventing any escape of gas.

The receiver is constructed so as to be self-cleansing, the back and front end being made at an angle, and that part of the basin which receives the water near the bottom of the door being contracted to equal the size of a fifteen-inch sewer. The water, falling four feet from the level of the street-gutter to the level of the water in the basin, will force all the sand, &c., out of the trap and wash it through the sewer.

I claim—

1. The back $a$ of the receiver A, and back $b$ of the trap B, constructed in a continuous line, and the exit end $b'$ of the trap elongated, as and for the purpose specified.

2. In a stench-trap and receiver, the inclines $e\ e$ and lugs $d\ d$, in combination with the gate C and swinging bar D, as and for the purpose specified.

In witness whereof I have hereunto signed my name in the presence of two subscribing witnesses.

THOMAS DARK.

Witnesses:
J. R. DRAKE,
T. H. PARSONS.